United States Patent
Holroyd et al.

(10) Patent No.: US 8,600,538 B2
(45) Date of Patent: Dec. 3, 2013

(54) SYSTEM AND METHOD FOR PRODUCING THREE-DIMENSIONAL MULTI-LAYER OBJECTS FROM DIGITAL MODELS

(75) Inventors: Michael Holroyd, Charlottesville, VA (US); Ilya Baran, Zurich (CH); Jason Davis Lawrence, Charlottesville, VA (US); Wojciech Matusik, Lexington, MA (US)

(73) Assignee: Disney Enterprises, Inc., Burbank, CA (US)

( * ) Notice: Subject to any disclaimer, the term of this patent is extended or adjusted under 35 U.S.C. 154(b) by 426 days.

(21) Appl. No.: 13/083,739

(22) Filed: Apr. 11, 2011

(65) Prior Publication Data
US 2012/0255663 A1  Oct. 11, 2012

(51) Int. Cl.
*G06F 19/00* (2011.01)
*G06K 15/02* (2006.01)

(52) U.S. Cl.
USPC .............................. 700/119; 156/60; 358/1.1

(58) Field of Classification Search
USPC ........................................................ 700/119
See application file for complete search history.

(56) References Cited

U.S. PATENT DOCUMENTS

| 7,688,319 B2 * | 3/2010 | Miller ........................... 345/422 |
| 2003/0167099 A1 * | 9/2003 | Kesavadas et al. ........... 700/119 |
| 2011/0222081 A1 * | 9/2011 | Yi et al. ......................... 358/1.9 |

* cited by examiner

*Primary Examiner* — Sean P. Shechtman
*Assistant Examiner* — Steven Garland
(74) *Attorney, Agent, or Firm* — Marsh Fischmann & Breyfogle, LLP; Kent A. Lembke (57) ABSTRACT

A set of two-dimensional layers is determined based on a digital three-dimensional model. An image corresponding to each of the layers is rendered on each of a corresponding number of sheets of at least partially transparent material. The sheets of material are assembled together to produce a three-dimensional structure corresponding to the digital model.

30 Claims, 12 Drawing Sheets

SYSTEM AND METHOD FOR PRODUCING THREE-DIMENSIONAL MULTI-LAYER OBJECTS FROM DIGITAL MODELS

BACKGROUND

Systems are known that fabricate three-dimensional (3D) objects from digital models of such objects. One type of system, commonly used in rapid prototyping, involves an additive manufacturing process, in which a computer-controlled machine builds up a 3D object from a series of cross-sections by applying successive layers of liquid, powder or other material.

Systems are also known that render a digital 3D model on a two-dimensional (2D) display, such as a conventional 2D computer screen. One type of 3D rendering system divides the 3D model into cross-sectional layer images and then reassembles the layers on the screen to depict the modeled object in three dimensions. Computed tomography (CT) and magnetic resonance imaging (MRI) machines similarly render 3D images on a screen by reassembling 2D layer images. Part of the rendering process in such systems may involve computing a color and opacity value for each pixel in each 2D layer image.

Some artists have produced 3D effects by painting on each of a number of glass or acrylic sheets and then stacking them together. Such a multi-layer work of art thus comprises a stack of 2D sheets stacked along a third dimension, yielding a 3D structure. The work of art can depict a subject in 3D because painted portions corresponding to portions of the subject reside at corresponding depths within the structure over a range of viewing directions.

Attempts have been made to electronically produce displays that provide an effect similar to that of the 3D artistic works described above. One such system included multiple 2D electronic displays that combined images using beamsplitters. Others involved projecting light onto thin layers of fog, parallel sheets of water droplets, or shutter planes. In all of these cases, the density and number of projection barriers is limited by cost or other practical considerations such as projector placement and refresh rate. Thus, it would be desirable to provide an improved automated process for creating a realistic 3D effect.

SUMMARY

Embodiments of the present invention relate to a system and method for producing a three-dimensional object or physical structure from a digital model. The digital model is used to determine a plurality of two-dimensional layers. Then, an image corresponding to each of the layers is rendered (e.g., printed) on each of a corresponding plurality of sheets of at least partially transparent material. The sheets of material can be assembled together to produce a three-dimensional structure corresponding to the digital model.

Other systems, methods, features, and advantages of the invention will be or become apparent to one of skill in the art to which the invention relates upon examination of the following figures and detailed description. All such additional systems, methods, features, and advantages are encompassed by this description and the accompanying claims.

BRIEF DESCRIPTION OF THE FIGURES

The invention can be better understood with reference to the following figures. The elements shown in the figures are not necessarily to scale, emphasis instead being placed upon clearly illustrating the principles of the invention. Also, in the figures like reference numerals designate corresponding elements throughout the different views.

DETAILED DESCRIPTION

Figure 1:
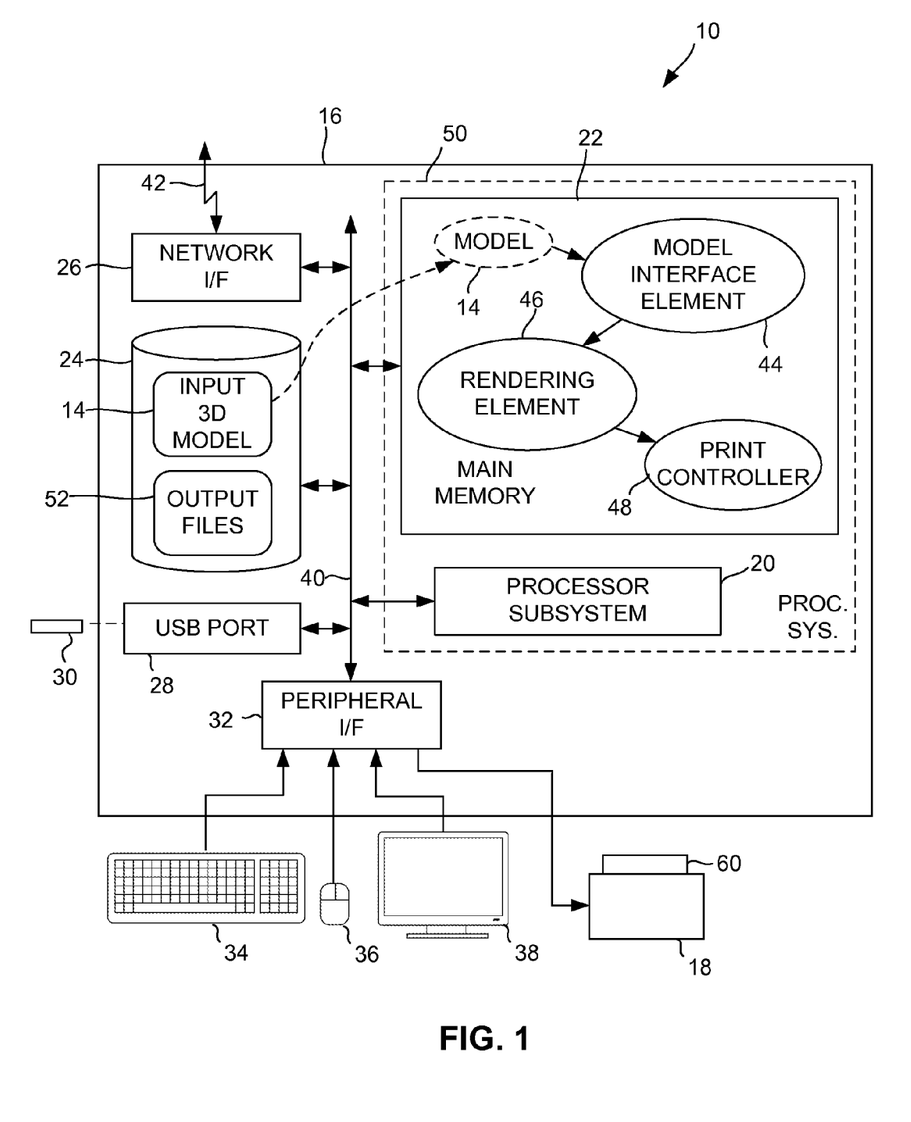
FIG. 1 is a block diagram of a computer system that is programmed and configured to effect a method for producing a three-dimensional structure from a digital model, in accordance with an exemplary embodiment of the invention.

As illustrated in FIG. 1, in an illustrative or exemplary embodiment of the invention, a system 10 for producing a three-dimensional (3D) object or structure 12 (FIGS. 2A-B) from a digital model 14 includes a computer system 16 that controls a printer 18. In the exemplary embodiment, computer system 16 essentially can be a personal computer system that has been suitably programmed or otherwise configured, as described below. But for the software elements described below, computer system 16 can have a conventional structure and configuration. Accordingly, computer system 16 includes hardware and software elements of the types commonly included in such computer systems, such as a processor subsystem 20, a memory subsystem 22, non-volatile data storage 24 (e.g., a hard disk drive, FLASH memory, etc.), a network interface 26, and one or more ports 28 for reading from and writing to external devices. Such external devices can include a removable data storage medium 30, such as a Universal Serial Bus (USB) "thumb drive." Computer system 16 also includes a peripheral interface 32 through which data communication with a keyboard 34, mouse 36, display 38 and the above-referenced printer 18 occur. Peripheral interface 32 can comprise USB ports of the same type as port 28 or any other suitable type of ports. In other embodiments, computer system 16 can include hardware and software elements in addition to those described herein or that are different from those described herein. The above-described elements can communicate with one another via a digital bus 40. Computer system 16 can communicate with remote devices (not shown) via a network connection 42, such as a connection to the Internet.

Memory subsystem 22 is generally of a type in which software elements, such as data and programming code, are operated upon by processor subsystem 20. In accordance with conventional computing principles, processor subsystem 20 operates in accordance with programming code, such as operating system code and application program code. In the exemplary embodiment of the invention, such application program code can include the following software elements: a model interface element 44, a rendering element 46, and a print controller element 48. Although these software elements are conceptually shown for purposes of illustration as stored or residing in memory subsystem 22, persons skilled in the art to which the invention relates can appreciate that such software elements may not reside simultaneously or in their entireties in memory subsystem 22 but rather may be retrieved in portions on an as-needed basis, e.g., in code segments, files, modules, objects, data structures, instruction-by-instruction, or any other suitable basis, from data storage 24 or other suitable source (e.g., via network connection 42). Note that although only model interface element 44, rendering element 46, and print controller element 48 are shown for purposes of clarity, other software elements of the types conventionally included in computers systems that enable them to operate properly are generally included, such as operating system software.

It should be noted that, as programmed or otherwise configured in accordance with the above-described software elements, the combination of processor subsystem 20, memory subsystem 22 (or other element or elements in which software is stored or resides) and any related elements generally defines a programmed processor system 50. It should also be noted that the combination of software elements and the medium on which they are stored or in which they reside (e.g., memory subsystem 22, data storage 24, removable data storage medium 30, etc.) generally constitutes what is referred to in the patent lexicon as a "computer program product."

The above-referenced digital model 14 can be stored in data storage 24 or other suitable data storage medium in the form of one or more files and used as input to the computer-implemented method in the manner described below. Likewise, output files 52 (e.g., representing the layer images that are generated in the manner described below) can be stored in data storage 24 or other suitable data storage medium. In some embodiments the process or method of producing a 3D object from digital model 14 can give rise to one or more intermediate or temporary data files or data structures (not shown), which can be stored in data storage 24, memory subsystem 22, or other suitable location. As persons skilled in the art to which the invention relates can appreciate, any of the above-described software elements, including data files, can be stored in any suitable format in any suitable location or combination of locations, in whole or part, and are only conceptually shown in FIG. 1 for purposes of illustration.

In the exemplary embodiment, a method of producing a 3D object from digital model 14 can be initiated by a person (user) who operates computer system 16. A user can operate computer system 16 locally using keyboard 34, mouse 36, display 38, etc., or remotely via network connection 42. Computer system 16 can be, for example, a server computer operated via a remote client (not shown). In operation, and in accordance with the effects of software elements that can include model interface element 44, rendering element 46, and print controller element 48, computer system 16 can provide a suitable user interface through which the user can interact with computer system 16.

Figure 2A:
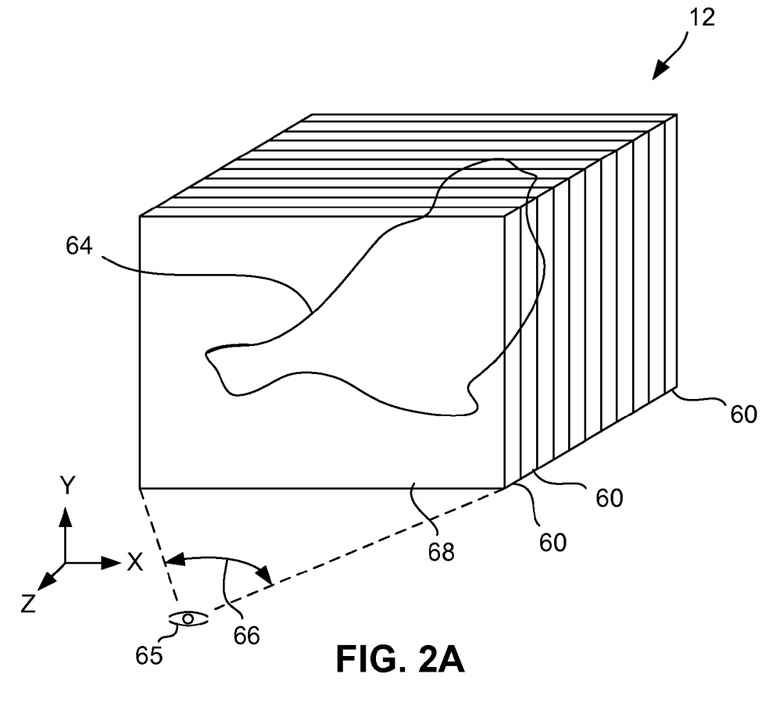
FIG. 2A is a generalized perspective view of a three-dimensional structure produced in accordance with an exemplary embodiment of the invention.
Figure 2B:
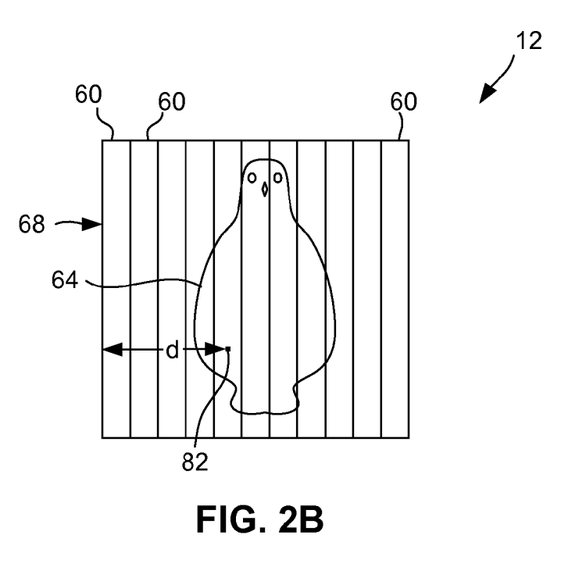
FIG. 2B is a generalized side view of the three-dimensional structure of FIG. 2A.
Figure 3:
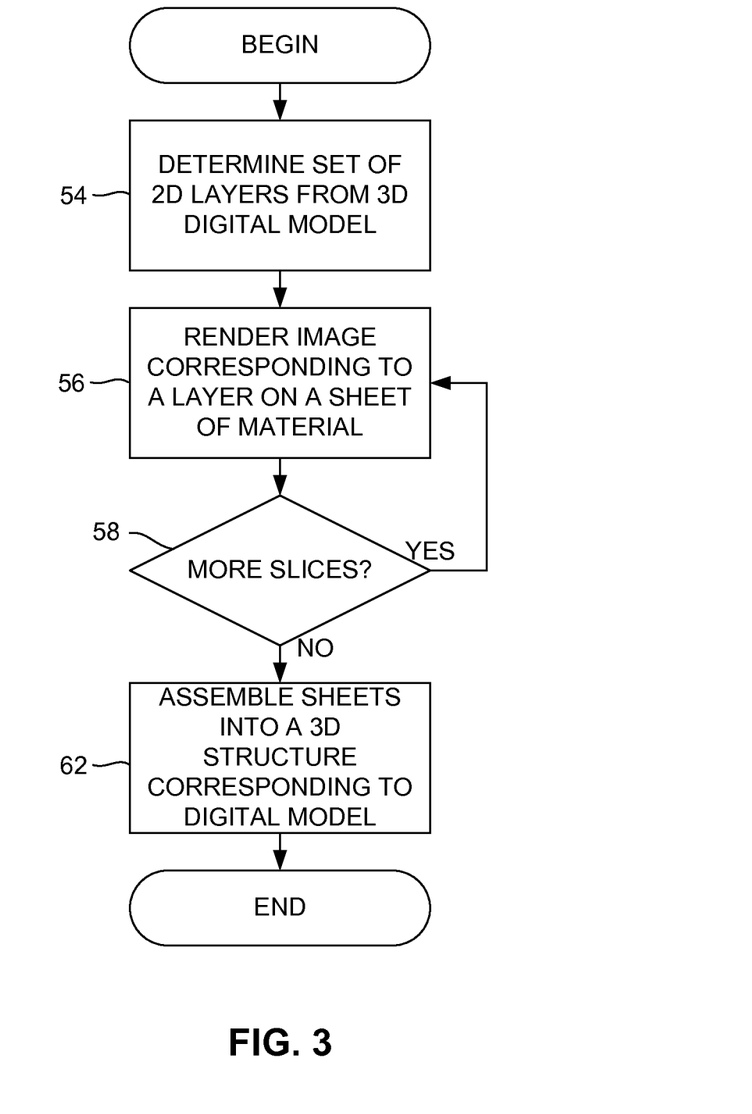
FIG. 3 is a flow diagram illustrating a method for producing a three-dimensional structure from a digital model, in accordance with an exemplary embodiment of the invention.

An exemplary method of producing a 3D object from digital model 14 is illustrated by the flow diagram of FIG. 3. In operation, computer system 16, in accordance with model interface element 44, determines a set of two-dimensional (2D) layers from the 3D digital model 14, as indicated by block 54. Digital model 14 can be of any suitable type, such as a polygon mesh or implicit surface. Conceptually, model 14 is divided or sliced into an array of such cross-sectional layers. Each layer comprises a 2D array of pixels, arrayed in an X-Y plane with respect to a 3D coordinate system having dimensions X, Y and Z. The layers are arrayed along the Z axis of the coordinate system. The layers represent cross-sectional views of the modeled subject represented by digital model 14. The layers can be designated or indexed for purposes of convenience in any suitable manner, such as by designating the top layer or layer closest to an observer as "layer_0," the next layer as "layer_1," etc. Then, computer system 16, in accordance with rendering element 46, forms and otherwise renders images corresponding to the layers, including causing printer 18, in accordance with print controller element 48 (FIG. 1), to print the layer images on a corresponding number of sheets 60 (FIGS. 2A-B) of a material that is transparent or at least semi-transparent to visible light, as indicated by blocks 56 and 58. That is, each layer image is printed on one of sheets 60. Examples of suitable materials include acetate, plastic (e.g., acrylic), and glass sheets. The printed sheets 60 can then be assembled together to form the 3D structure 12, as indicated by block 62. The assembly can be performed by hand, such as by stacking the printed sheets 60, or by an automated printing machine. For structural stability, in an instance in which sheets 60 are made of a flexible material, such as acetate, they can be placed between or mounted to sheets of a more rigid material such as acrylic or glass.

Note in FIGS. 2A-B that the assembled sheets 60 that define structure 12 correspond to model 14 in that a 3D image 64 of the modeled subject can be observed within structure 12. In the example shown in FIGS. 2A-B, the subject of 3D image 64 is a sculpture of a bird. When viewed from a point within a range (cone) of possible viewing directions 66, such as within a range of possible viewing directions 66 facing a side 68 of structure 12, image 64 appears three-dimensional. In the illustrated example, a human observer 65 viewing structure 12 from within a range of possible viewing directions 66 would perceive an image 64 that resembles the bird sculpture.

Figure 4:
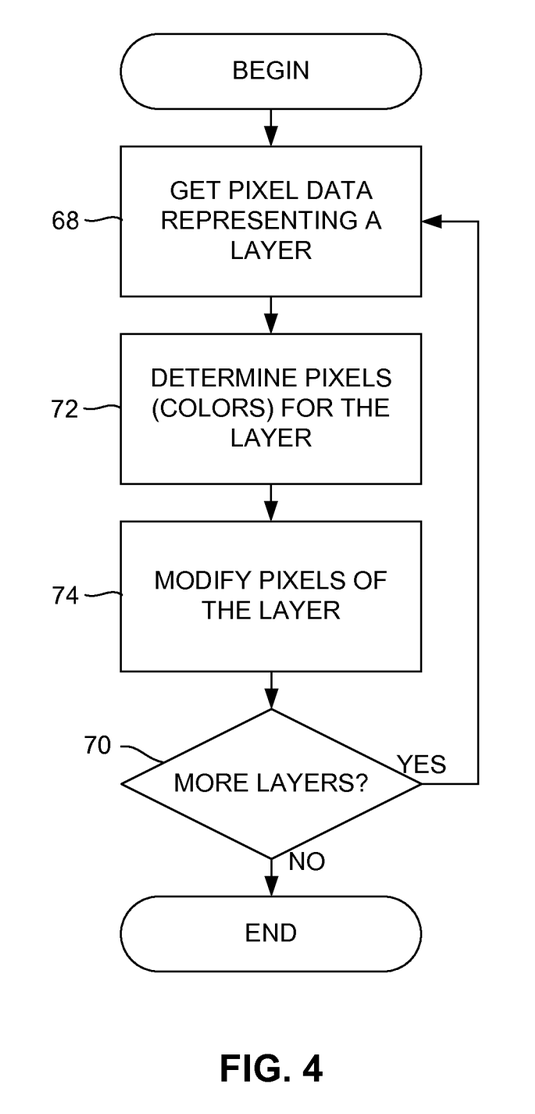
FIG. 4 is a flow diagram illustrating a portion of the method illustrated in FIG. 3, in which pixels are determined and modified.

As illustrated in FIG. 4, the exemplary method of rendering the images (FIG. 3, block 56) uses successive layers as input, as indicated by the process flow loop between blocks 68 and 70. As indicated by block 68, rendering or otherwise processing a layer refers to processing the pixel data that the layer comprises. For each layer, rendering a corresponding image can include determining a color for each pixel position in the layer, as indicated by block 72. Also, for each layer, rendering the corresponding image can further include modifying the pixels in the layer, as indicated by block 74.

Figure 5:
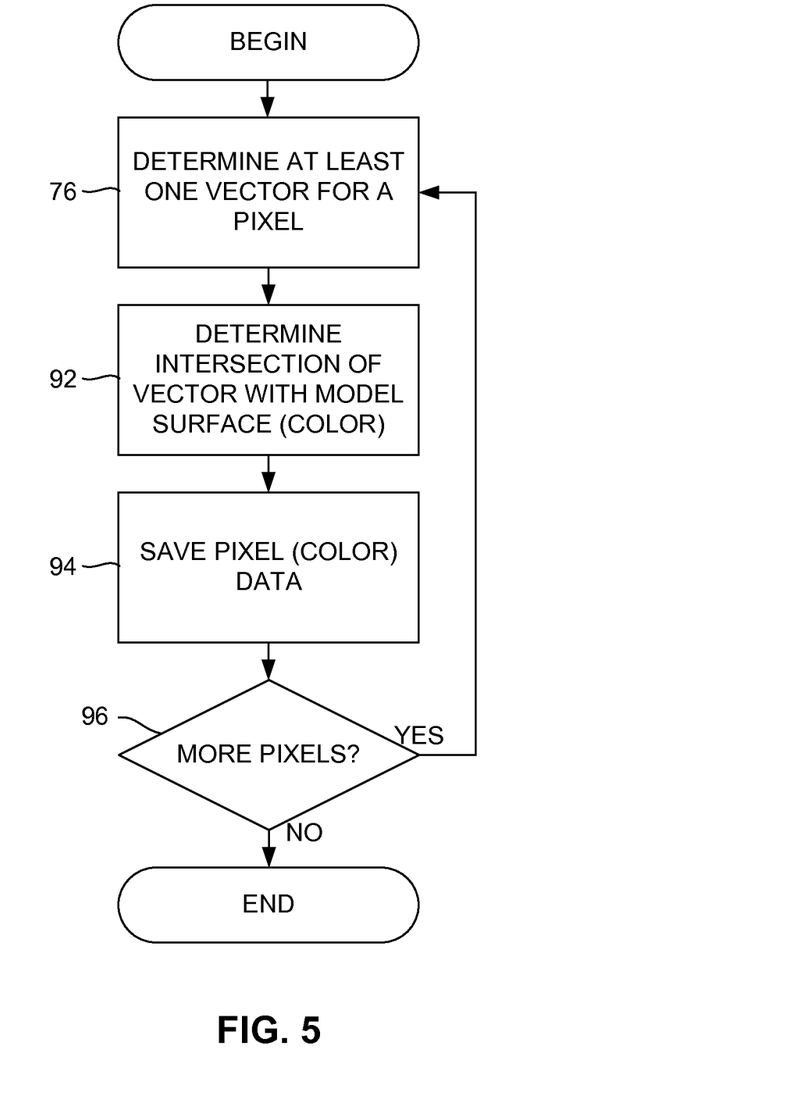
FIG. 5 is a flow diagram illustrating a portion of the method illustrated in FIG. 4, in which pixels are determined by determining an intersection of a vector with the surface of the digital model.
Figure 6:
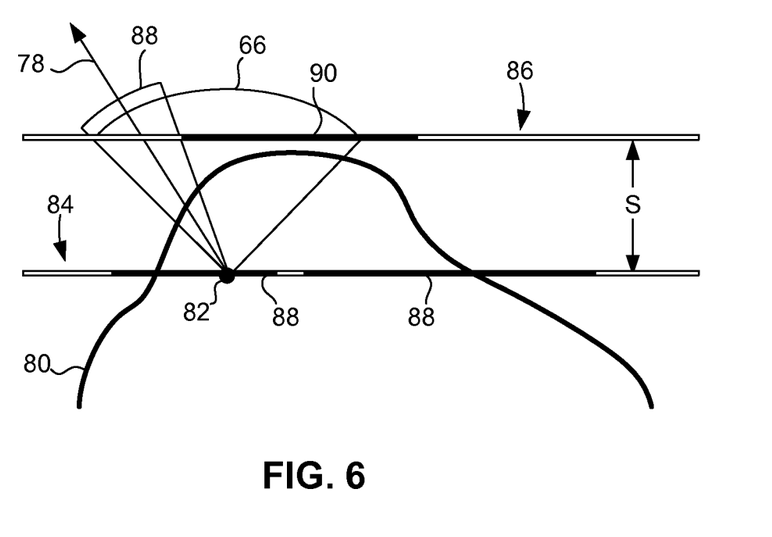
FIG. 6 is a ray diagram illustrating a portion of the method illustrated in FIG. 5, in which a mean visible view direction is determined.

An exemplary method of determining pixel colors in a layer (FIG. 4, block 72) is illustrated in FIG. 5. The method can include determining at least one vector corresponding to each pixel of the layer, as indicated by block 76. As illustrated in FIG. 6, the vector can be, for example, a mean visible view direction 78. A portion 80 of the layer is shown to illustrate the cross-sectional shape. In the example shown in FIG. 5, portion 80 represents a portion of a cross-sectional view through the above-referenced bird sculpture subject. In the example shown in FIG. 6, mean visible view direction 78 is shown for an arbitrary or exemplary pixel 82 of a second layer 84 (which can be referred to as "layer_1"). A first layer 86 (which can be referred to as "layer_0") is the outermost layer and is adjacent to second layer 84. The spacing (s) between layers 86 and 84 and between all other pairs of adjacent layers (not shown) can be of any suitable size. Mean visible view direction 78 represents the average of the set 88 of vectors extending from pixel 82 that lie within the range of possible viewing directions 66 and are not occluded by (opaque) pixels 90 of other layers. "Opaque" pixels are those that have values other than completely transparent. The term "opacity layer" can be used to refer to a derived layer that monochromatically expresses pixel values of a layer, i.e., without regard to color.

The mean visible view direction of a pixel of an $n^{th}$ layer ("layer_n") can be approximated using, for example, the following method. The method uses an alpha mask that is equal to the maximum of all previously processed layers (or, more specifically, opacity layers). As well understood in the art, an alpha mask is a binary pixel mask, where a value of "1" in a pixel position indicates the existence of a pixel, and a value of "0" in a pixel position indicates the absence of a pixel (i.e., a completely transparent pixel). When the first layer 86 (layer_0) is processed, the alpha mask begins in a state in which all pixel positions are initialized to a value of "0". The alpha mask (B) is convolved with three filters that can be referred to as $G_x$, $G_y$, and G. The filters can be created for the $n^{th}$ layer by taking a vector starting from the center of the next or $(n+1)^{th}$ layer ("layer_n+1") and ending at each pixel on the $n^{th}$ layer. This vector is then normalized, and the x component is stored in filter $G_x$, the y component is stored in filter $G_y$, and a "1" is stored in filter G. The filter G acts as a normalization factor. Only vectors inside the range of possible viewing directions 66 are processed in this manner. The remainder of filters $G_x$, $G_y$ and G, which correspond to directions outside of the range of possible viewing directions 66, are set to zero. The mean visible view direction (vector "v") can then be computed as (where the asterisk symbol ("*") denotes convolution):

$v_x = (B*G_x)/(B*G)$ $v_y = (B*G_y)/(B*G)$ $v_z = \sqrt{(v_x^2 + v_y^2)}$

Returning to FIG. 5, in the exemplary embodiment the position of the intersection of the mean visible view direction of a pixel and the surface of digital model 14 is then determined, as indicated by block 92. (More specifically, the intersection of the surface of digital model 14 with a ray whose origin is at the pixel and whose direction is parallel to the mean visible view direction is determined.) The color of the surface of digital model 14 at the intersection position is stored in the pixel position on the $n^{th}$ layer, as indicated by block 94. Vectors that do not intersect the surface of digital model 14 are left transparent. This method of determining pixel colors is repeated until all pixels of the $n^{th}$ layer are processed, as indicated by block 96.

Figure 7:
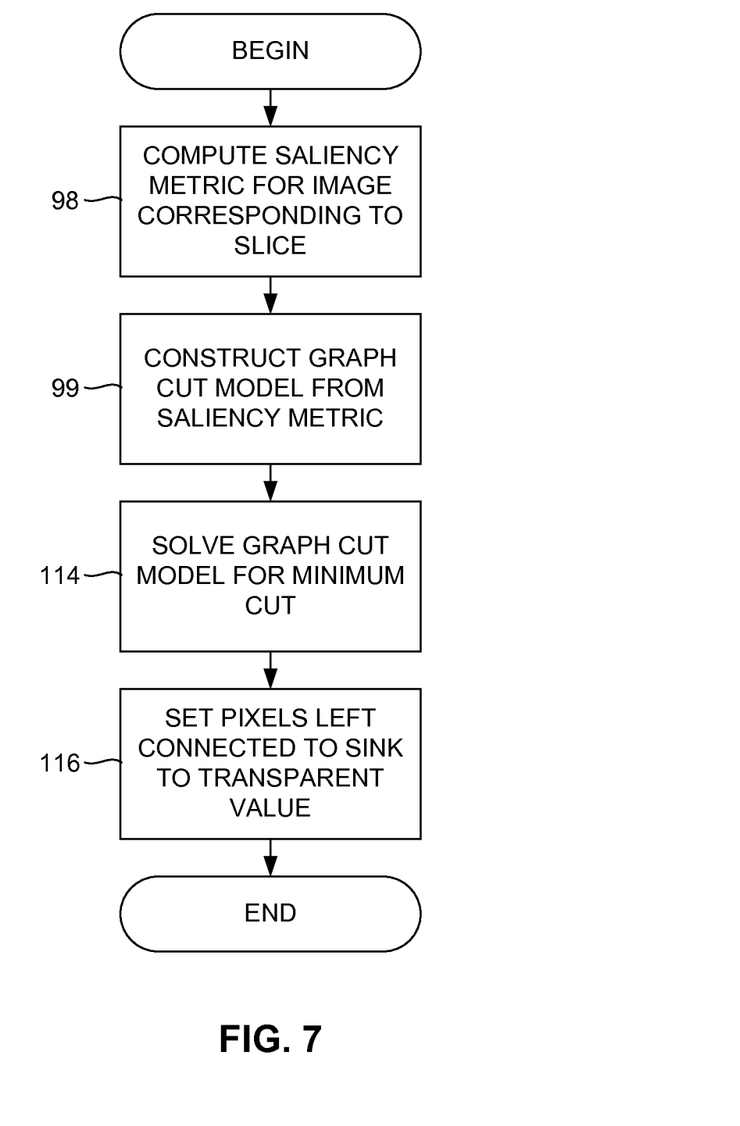
FIG. 7 is a flow diagram illustrating a portion of the method illustrated in FIG. 4, in which pixels are modified in response to saliency information and distance of the pixel from the surface of the digital model.

An exemplary method of modifying pixel colors in a layer (FIG. 4, block 74) is illustrated in FIG. 7. The exemplary method illustrated in FIG. 7 modifies pixel colors based upon both image saliency information and distance between a pixel and the outermost layer. However, in other embodiments pixel colors can be modified based on saliency information but not distance or, alternatively, based on distance but not saliency information. In still other embodiments, pixel colors can be modified based on still other combinations of various types of information.

The term "saliency" is commonly used in the art to refer to information about image features that may affect the desired outcome of an image processing method. In the case of the exemplary embodiment of the invention, the saliency information relates to features of 3D image 64 (FIGS. 2A-B) that would intersect the boundaries between adjacent sheets 60 in the assembled structure 12 in a way that a human observer would likely perceive as visually jarring. For example, absent modifying pixels as described herein, the periphery of the modeled subject's eye in 3D image 64 could be partly on one layer image and partly on an adjacent layer image. Although in other embodiments this type of saliency information can be input manually by an operator through observation of the images, a more automated method is used in the exemplary embodiment. In this method, the assignment of colors to pixel positions (e.g., as described above with regard to FIG. 5) is refined as a solution to a graph cut problem using a saliency metric. The use of the saliency metric represents a form of edge detection. In other embodiments, other forms of edge detection can be used to provide saliency information.

As indicated by block 98, the saliency metric (S) is first computed. Then, the saliency metric is used in a graph cut, as indicated by block 99. Referring to the arbitrary example illustrated in FIG. 8, a graph 100 is constructed in which each pixel in the current ($n^{th}$) layer being processed is modeled as a pixel node 102. Graph 100 has edges 104 that connect adjacent pixel nodes 102, edges 106 that connect pixel nodes 98 to a source node 108, and edges 110 ($e_{sink}$) that connect pixel nodes 98 to a sink node 112. To achieve the desired property that pixels should be assigned colors from nearby locations on the surface of digital model 14, the weights ($e_{source}$) along edges 106 and the weights ($e_{sink}$) along edges 110 are proportional to the distances to the intersection with the outermost layer along the above-described mean visible view directions 78 for the corresponding pixels. The weights ($e_{i,j}$) along edges 104 between two pixel nodes 102 (representing a pair of pixels i and j) are based on the saliency metric (S).

A saliency metric (S) for the current ($n^{th}$) layer can be computed, for example, as follows. In the computations, "t" represents the signed distance along a mean visible view direction 78 to the intersection with the nearest point on the outermost layer for a given pixel (i) or (j). Note that t>0 if this nearest point on the outermost layer is above the current layer and t<0 if it is below the current layer. More specifically, S can be computed by convolving the initial layer values (i.e., the pixel colors determined in the manner described above with regard to FIG. 5) with a difference of Gaussians (e.g., σ=5.1) so that S is large near edges of image features and small in uniform regions of the image. The edge weights can be assigned as follows: $e_{i,j} = |S_i + S_j|$, $e_{sink} = \min(0, -t)$, and $e_{source} = \min(t, 0)$.

Figure 8:
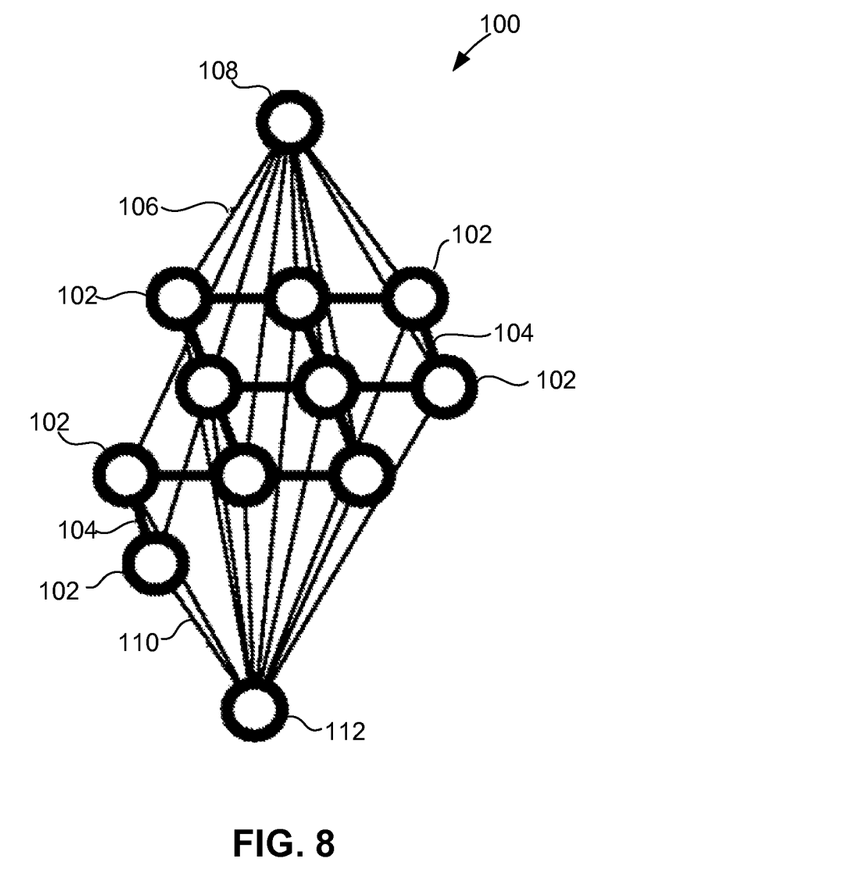
FIG. 8 is an example of a graph of a type usable in the method illustrated in FIG. 7.

As indicated by block 114, the minimum cut of such a graph 100 is computed. After the minimum cut is computed, pixel nodes 102 that remain connected to source node 108 are to remain on the current layer being processed. Any pixel nodes 102 that remain connected to sink node 112 will be assigned to a layer yet to be processed. Thus, as indicated by block 116, pixels of the current layer that are represented by any such pixel nodes 102 remaining connected to sink node 112 are set to a transparent, i.e., colorless, value.

Figure 9:
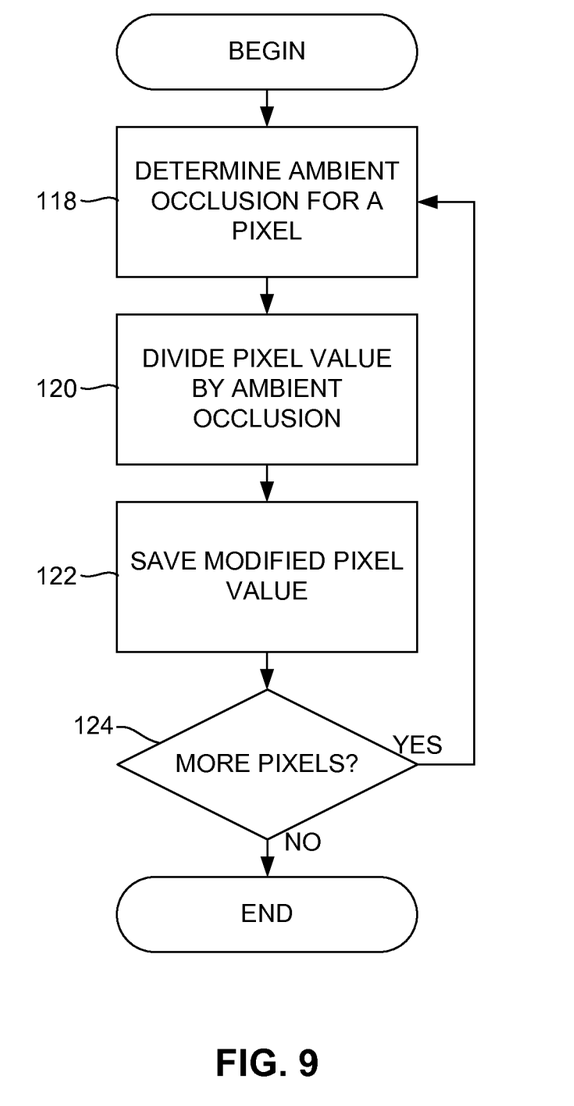
FIG. 9 is a flow diagram illustrating a portion of the method illustrated in FIG. 4, in which pixels are modified in response to ambient occlusion.
Figure 10:
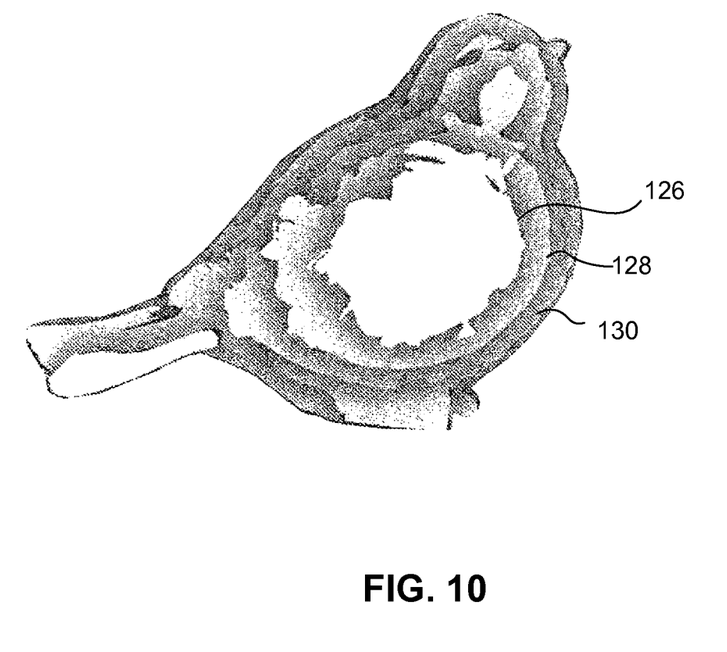
FIG. 10 illustrates an example of ambient occlusion of adjacent layers in the method illustrated in FIG. 9.

Another exemplary method of modifying pixel colors in a layer (FIG. 4, block 74) is illustrated in FIG. 9. The method illustrated in FIG. 9 modifies pixel colors based upon occlusion information representing occlusion of a pixel in a layer by portions of other layers. Modifying pixel colors in this manner may be useful because in the assembled structure 12 (FIGS. 2A-B), a layer image that is printed on its corresponding sheet 60 potentially casts shadows onto layer images of other sheets 60. The shadows can undesirably reveal the discrete or multi-layer nature of structure 12 to an observer. The occlusion information can be defined by, for example, the ambient occlusion. Ambient occlusion is a term used in the art to describe the percentage of light that can reach a pixel in a 3D image model. As indicated by block 118, the ambient occlusion of a pixel in the layer is determined. An estimate of the ambient occlusion of the pixels in the layer can be determined by, for example, convolving the above-described alpha mask with a cosine-weighted filter. As indicated by block 120, the initial value or color of each pixel in the layer is then divided by this estimate of ambient occlusion for that pixel. As indicated by block 122, the initial pixel value is replaced with the result of this division, which represents the modified pixel value. This method of modifying pixel colors is repeated until all pixels of the $n^{th}$ layer are processed, as indicated by block 124. A visualization of the ambient occlusion produced by several exemplary layers 126, 128, 130, etc., is shown in FIG. 10.

Figure 11:
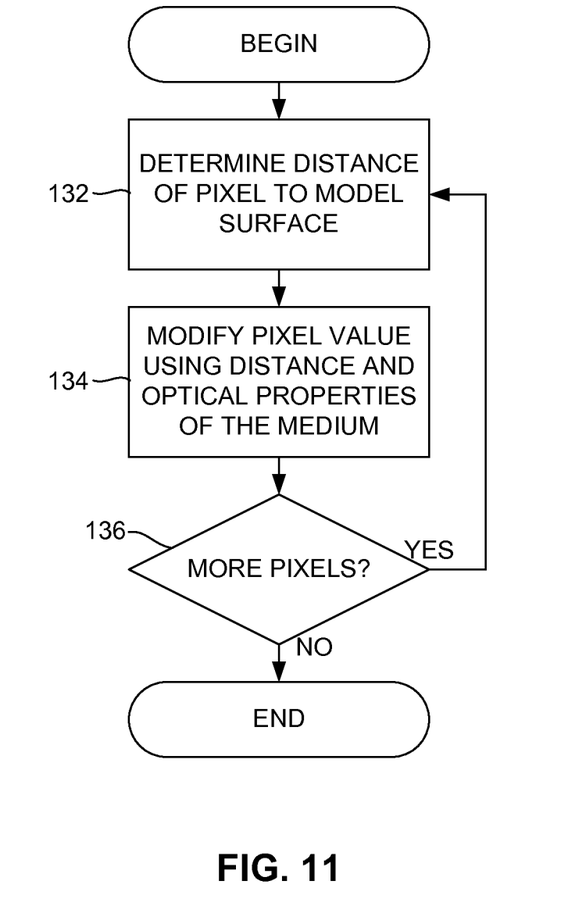
FIG. 11 is a flow diagram illustrating a portion of the method illustrated in FIG. 4, in which pixels are modified in response to distance of the pixel from the surface of the digital model and optical properties of the sheets of material on which the images are printed.

Another exemplary method of modifying pixel colors in a layer (FIG. 4, block 74) is illustrated in FIG. 11. The method illustrated in FIG. 11 modifies pixel colors based upon the distance between a pixel and the outermost layer. Modifying pixel colors in this manner may be useful because in the assembled structure 12 (FIGS. 2A-B), a layer image printed on a corresponding sheet 60 farther from the observer may incorrectly appear to have lower contrast and brightness than a layer image printed on a corresponding sheet 60 closer to the observer. These effects are caused by optical absorption and scattering of the material, such as acrylic or glass, from which sheets 60 are formed.

As indicated by block 132, the distance (d) between a pixel and the surface of digital model 14 in a direction normal to the layer is determined (see FIG. 2B). As indicated by block 134, the equation $K'=K\ e^{(-\sigma*d)}+A(1-e^{(-\beta*d)})$ can be solved for a printed pixel color K, where K' is the color of the pixel, d is the distance, σ is the scattering coefficient of the material of sheets 60, β is the isotropic inscattering coefficient of the material of sheets 60, and A is the color of the material of sheets 60 resulting from inscattering light (commonly referred to as the airlight color). The equation is based on the well-known airlight model that has been used to correct images for atmospheric effects. The equation above fits the parameters of an analytic function that predicts color desaturation as a function of the distance a ray of light travels through the material of sheets 60. The equation $K'=K\ e^{(-\sigma*d)}+A(1-e^{(-\beta*d)})$ asserts that an opaque pixel with color K, when observed through the material of sheets 60 with depth d, will produce the color K' as a result of absorption and multiple scattering. Persons skilled in the art are capable of readily estimating values for A, σ and β. Alternatively, suitable values for A, σ and β can be determined empirically by measuring colors through a number of different thicknesses of sheets 60. A conventional color checker chart, which is a sheet of white material on which samples of colors are printed, can be used. For example, a first set of measurements can be taken of the color checker chart through a single sheet 60, a second set of measurements can be taken of the color checker chart through two sheets 60, a third set of measurements of the color checker chart can be taken through three sheets 60. As persons skilled in the art are familiar with determining values for A, σ and β in airlight models, the method is not described in further detail herein. This method of determining pixel colors is repeated until all pixels of the $n^{th}$ layer are processed, as indicated by block 136.

Figure 12:
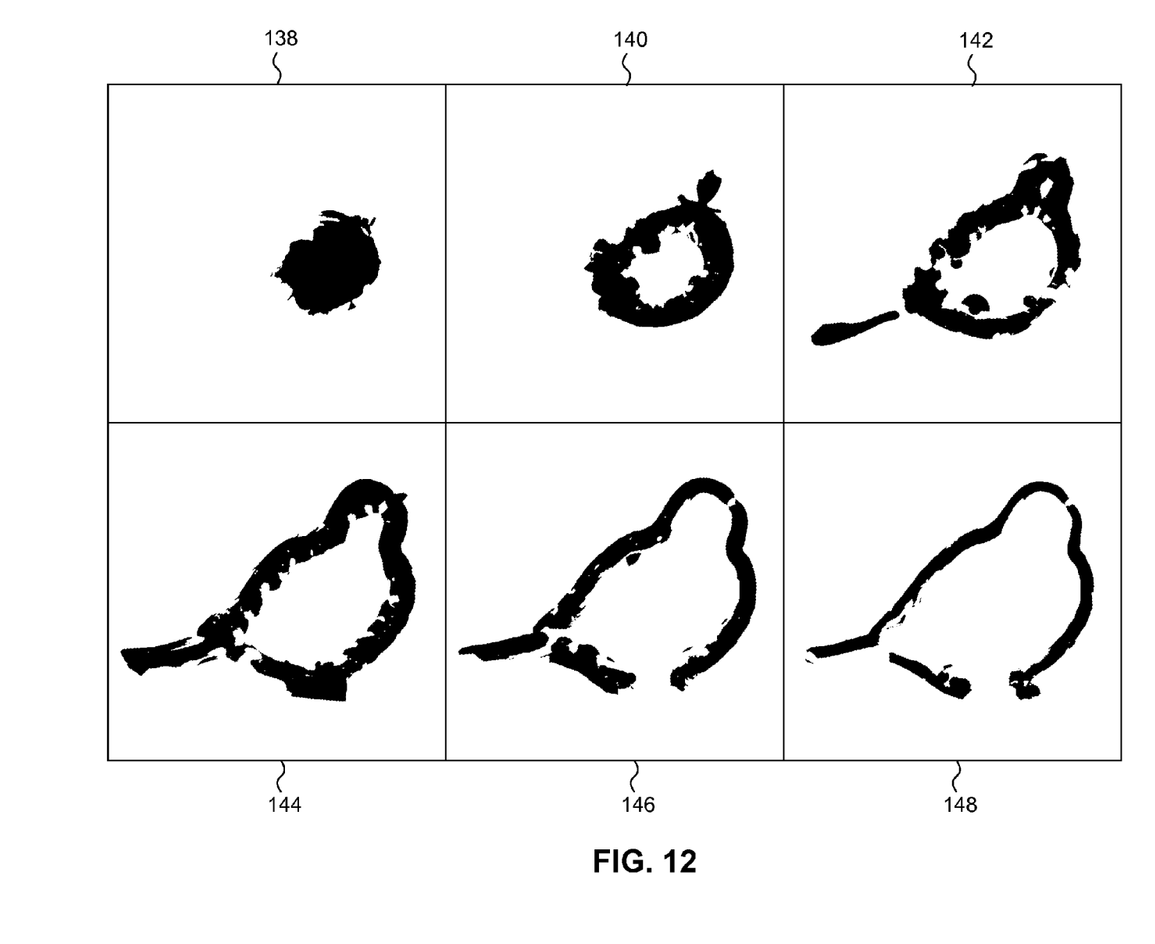
FIG. 12 illustrates an example of a set of printed sheets of material prior to assembling together into a three-dimensional structure, showing opacity only and not color.

When the colors of pixels of the current or $n^{th}$ layer have been modified by one or more of the methods described above, the method described above with regard to FIG. 4 proceeds to the next or $(n+1)^{th}$ layer, as indicated by block 70. When computer system 16 has processed all of the layers as described above with regard to FIG. 4, computer system 16 causes printer 18 to print each layer image on a corresponding sheet of material. An exemplary set of printed sheets 138, 140, 142, 144, 146 and 148 is shown in FIG. 12. As described above with regard to block 62 of FIG. 3, the sheets that have been printed with such layer images can then be stacked or otherwise assembled to form the box-shaped structure 12 (FIG. 2A-B). As a result of the above-described method, structure 12 appears to an observer as a 3D image 64 corresponding to the subject of digital model 14 embedded within a transparent box-shaped region.

While one or more embodiments of the invention have been described as illustrative of or examples of the invention, it will be apparent to those of ordinary skill in the art that other embodiments are possible that are within the scope of the invention. Accordingly, the scope of the invention is not to be limited by such embodiments but rather is determined by the appended claims.

What is claimed is:

1. A method for producing a three-dimensional structure from a digital model, comprising:
   determining a plurality of two-dimensional layers in response to the digital model;
   rendering an image corresponding to each of the layers on each of a corresponding plurality of sheets of at least partially transparent material; and
   assembling the plurality of sheets of material together to produce a three-dimensional structure corresponding to the digital model,
   wherein the step of determining a plurality of two-dimensional layers comprises, for each layer:
   determining a vector corresponding to each pixel of the layer;
   determining a ray having an origin at the pixel and a direction parallel to the vector;
   determining an intersection of the ray with a surface of the digital model; and
   determining a color of the surface of the digital model at the intersection.

2. The method of claim 1, wherein the step of determining a vector comprises:
   determining occlusion information in response to the digital model, the occlusion information representing occlusion of the pixel on the layer by portions of other layers with respect to a viewing direction region; and
   determining the vector in response to the occlusion information.

3. The method of claim 2, wherein the step of determining the vector in response to the occlusion information comprises determining an average of a plurality of unoccluded view vectors within the viewing direction region.

4. The method of claim 1, wherein the step of determining a plurality of two-dimensional layers further comprises, for each layer, modifying the color of a pixel in response to occlusion information representing occlusion of the pixel by portions of other layers with respect to a viewing direction region.

5. The method of claim 4, wherein the step of modifying the color of the pixel comprises dividing the color of the pixel by an ambient occlusion representing a percentage of light not occluded by portions of other layers.

6. The method of claim 1, wherein the step of determining a plurality of two-dimensional layers further comprises, for each layer:
   determining a distance between a pixel and an outermost layer; and
   modifying a color of the pixel in response to the distance.

7. The method of claim 6, wherein the step of modifying a color of the pixel in response to the distance comprises modifying the color of the pixel by dividing the color of the pixel by $e^{(-\sigma*d)}$ where d is the distance and $\sigma$ is a scattering coefficient of the material.

8. The method of claim 7, wherein the step of modifying the color of the pixel comprises solving an airlight equation of the form $K'=K\ e^{(-\sigma*d)}+A(1-e^{(-\beta*d)})$ for a printed pixel color K, where K' is the color of the pixel, d is the distance, $\sigma$ is the scattering coefficient of the material, $\beta$ is the inscattering coefficient of the material, and A is an airlight color resulting from inscattering light.

9. The method of claim 6, further comprising modifying a color of the pixel in response to a printer gamut.

10. A method for producing a three-dimensional structure from a digital model, comprising:
   determining a plurality of two-dimensional layers in response to the digital model;
   rendering an image corresponding to each of the layers on each of a corresponding plurality of sheets of at least partially transparent material; and
   assembling the plurality of sheets of material together to produce a three-dimensional structure corresponding to the digital model,
   wherein the step of determining a plurality of two-dimensional layers further comprises, for each layer:
      determining a set of one or more pixels to be set to a transparency value corresponding to at least partial transparency based on at least one of saliency information relating to salient image features of the layer and distance between a pixel and a surface of the digital model; and
      setting each pixel of the set to the transparency value.

11. The method of claim 10, wherein:
   the set of one or more pixels to be set to a transparency value is determined based on both saliency information and distance between a pixel and the surface of the digital model; and
   the step of determining a set of one or more pixels to be set to a transparent value comprises computing a minimum graph cut using a graph having nodes corresponding to pixels and edges weighted by the saliency information and the distance between a pixel and the surface of the digital model.

12. A system, comprising:
   a printer;
   a programmed processing system comprising a processor subsystem and a memory subsystem, the programmed processing system executing instructions to:
      determine a plurality of two-dimensional layers in response to a digital model; and
      control the printer to print an image corresponding to each of the layers on each of a corresponding plurality of sheets of at least partially transparent material,
      wherein the plurality of sheets together define a three-dimensional structure corresponding to the digital model,
   wherein the programmed processing system determines a plurality of two-dimensional layers by, for each layer:
      determining a vector corresponding to each pixel of the layer;
      determining a ray having an origin at the pixel and a direction parallel to the vector;
      determining an intersection of the ray with a surface of the digital model; and
      determining a color of the surface of the digital model at the intersection.

13. The system of claim 12, wherein the programmed process system determines a vector by:
   determining occlusion information in response to the digital model, the occlusion information representing occlusion of the pixel on the layer by portions of other layers with respect to a viewing direction region; and
   determining the vector in response to the occlusion information.

14. The system of claim 13, wherein the programmed processing system determines the vector in response to the occlusion information comprises determining an average of a plurality of unoccluded view vectors within the viewing direction region.

15. The system of claim 12, wherein the programmed processing system further determines the plurality of two-dimensional layers by, for each layer, modifying the color of a pixel in response to occlusion information representing occlusion of the pixel by portions of other layers with respect to a viewing direction region.

16. The system of claim 15, wherein the programmed processing system modifies the color of the pixel comprises dividing the color of the pixel by an ambient occlusion representing a percentage of light not occluded by portions of other layers.

17. The system of claim 12, wherein the programmed processing system further determines the plurality of two-dimensional layers by, for each layer:
   determining a distance between a pixel and an outermost layer; and
   modifying a color of the pixel in response to the distance.

18. The system of claim 17, wherein the programmed processing system modifies the color of the pixel in response to the distance by modifying the color of the pixel by dividing the color of the pixel by $e^{(-\sigma*d)}$ where d is the distance and $\sigma$ is a scattering coefficient of the material.

19. The system of claim 18, wherein the programmed processing system modifies the color of the pixel by solving an airlight equation of the form $K'=K\ e^{(-\sigma*d)}+A(1-e^{(-\beta*d)})$ for a printed pixel color K, where K' is the color of the pixel, d is the distance, $\sigma$ is the scattering coefficient of the material, $\beta$ is the inscattering coefficient of the material, and A is an airlight color resulting from inscattering light.

20. The system of claim 17, wherein the programmed processing system further modifies the color of the pixel in response to a printer gamut.

21. A system, comprising:
   a printer;
   a programmed processing system comprising a processor subsystem and a memory subsystem, the programmed processing system executing instructions to:
      determine a plurality of two-dimensional layers in response to a digital model; and
      control the printer to print an image corresponding to each of the layers on each of a corresponding plurality of sheets of at least partially transparent material, wherein the plurality of sheets together define a three-dimensional structure corresponding to the digital model, wherein the programmed processing system further determines a plurality of two-dimensional layers by, for each layer:

determining a set of one or more pixels to be set to a transparency value corresponding to at least partial transparency based on at least one of saliency information relating to salient image features of the layer and distance between a pixel and a surface of the digital model; and setting each pixel of the set to the transparency value.

22. The system of claim 21, wherein:

the programmed processing system determines the set of one or more pixels based on both saliency information and distance between a pixel and the surface of the digital model; and the programmed processing system determines the set of one or more pixels to be set to a transparent value comprises computing a minimum graph cut using a graph having nodes corresponding to pixels and edges weighted by the saliency information and the distance between a pixel and the surface of the digital model.

23. A computer program product for producing a three-dimensional structure from a digital model, comprising a non-transitory computer-readable storage medium on which is stored in executable form instructions that, when executed on a computer system, cause the computer system to:

determine a plurality of two-dimensional layers in response to a digital model; and control a printer to print an image corresponding to each of the layers on each of a corresponding plurality of sheets of at least partially transparent material, wherein the plurality of sheets together define a three-dimensional structure corresponding to the digital model, wherein the instructions cause the computer system to determine a plurality of two-dimensional layers by, for each layer:

determining a vector corresponding to each pixel of the layer;

determining a ray having an origin at the pixel and a direction parallel to the vector;

determining an intersection of the ray with a surface of the digital model; and determining a color of the surface of the digital model at the intersection.

24. The computer program product of claim 23, wherein instructions cause the computer system to determine a vector by:

determining occlusion information in response to the digital model, the occlusion information representing occlusion of the pixel on the layer by portions of other layers with respect to a viewing direction region; and determining the vector in response to the occlusion information.

25. The computer program product of claim 24, wherein the instructions cause the computer system to determine the vector in response to the occlusion information comprises determining an average of a plurality of unoccluded view vectors within the viewing direction region.

26. The computer program product of claim 23, wherein the instructions cause the computer system to determine the plurality of two-dimensional layers by, for each layer, modifying the color of a pixel in response to occlusion information representing occlusion of the pixel by portions of other layers with respect to a viewing direction region.

27. The computer program product of claim 26, wherein the instructions cause the computer system to modify the color of the pixel comprises dividing the color of the pixel by an ambient occlusion representing a percentage of light not occluded by portions of other layers.

28. The computer program product of claim 23, wherein the instructions cause the computer system to determine the plurality of two-dimensional layers by, for each layer:

determining a distance between a pixel and an outermost layer; and modifying a color of the pixel in response to the distance.

29. A computer program product for producing a three-dimensional structure from a digital model, comprising a non-transitory computer-readable storage medium on which is stored in executable form instructions that, when executed on a computer system, cause the computer system to:

determine a plurality of two-dimensional layers in response to a digital model; and control a printer to print an image corresponding to each of the layers on each of a corresponding plurality of sheets of at least partially transparent material, wherein the plurality of sheets together define a three-dimensional structure corresponding to the digital model, wherein the instructions cause the computer system to further determine a plurality of two-dimensional layers by, for each layer:

determining a set of one or more pixels to be set to a transparency value corresponding to at least partial transparency based on at least one of saliency information relating to salient image features of the layer and distance between a pixel and a surface of the digital model; and setting each pixel of the set to the transparency value.

30. The computer program product of claim 29, wherein the instructions cause the computer system to:

determine the set of one or more pixels based on both saliency information and distance between a pixel and the surface of the digital model; and determine the set of one or more pixels to be set to a transparent value comprises computing a minimum graph cut using a graph having nodes corresponding to pixels and edges weighted by the saliency information and the distance between a pixel and the surface of the digital model.

* * * * *